W. REMINGTON.
INTERNAL COMBUSTION ENGINE.
APPLICATION FILED OCT. 9, 1905. RENEWED FEB. 25, 1908.
903,774.
Patented Nov. 10, 1908.
2 SHEETS—SHEET 1.
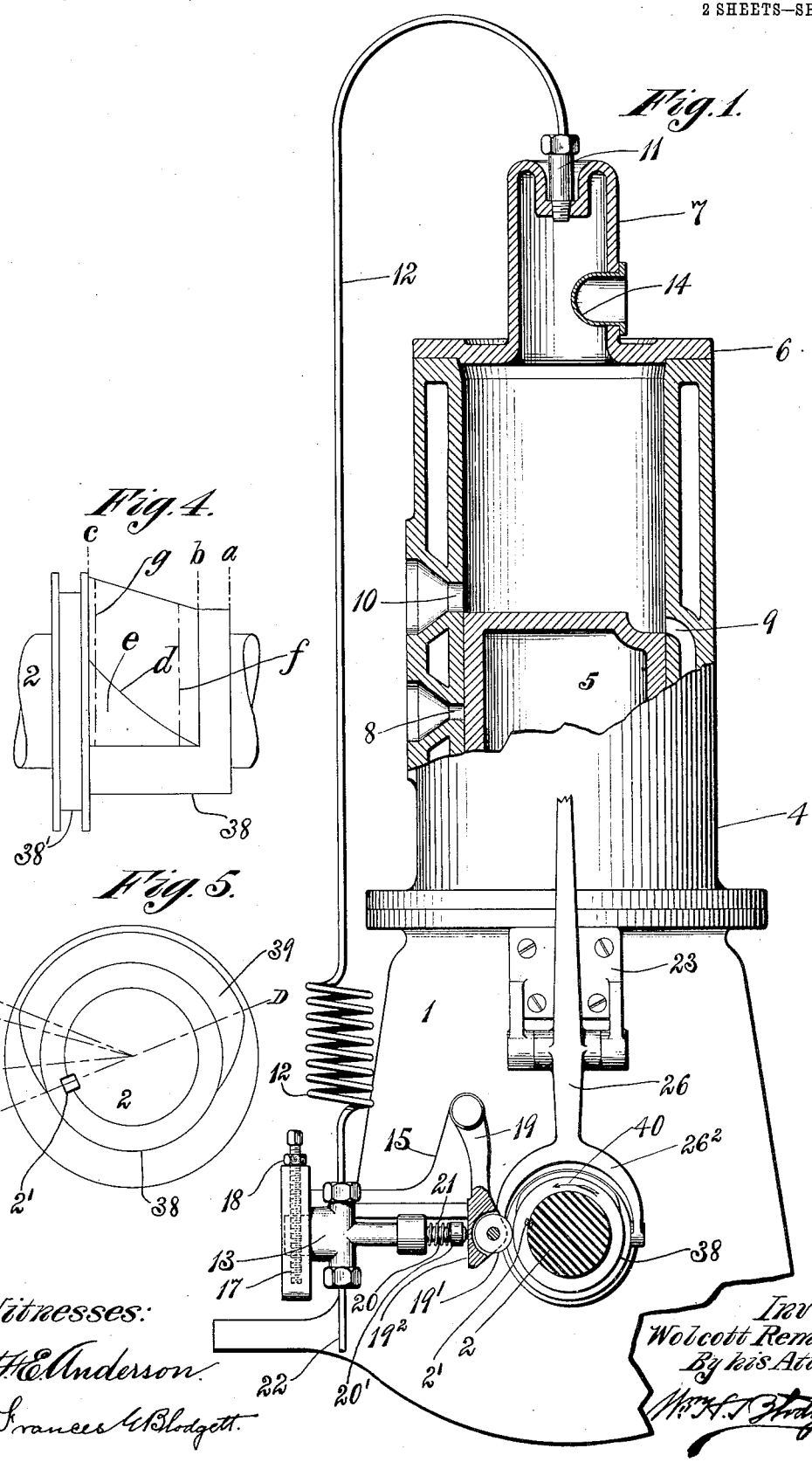
Witnesses:
H. E. Anderson.
Frances M. Blodgett.
Inventor:
Wolcott Remington,
By his Attorney,
W. H. S. Blodgett.

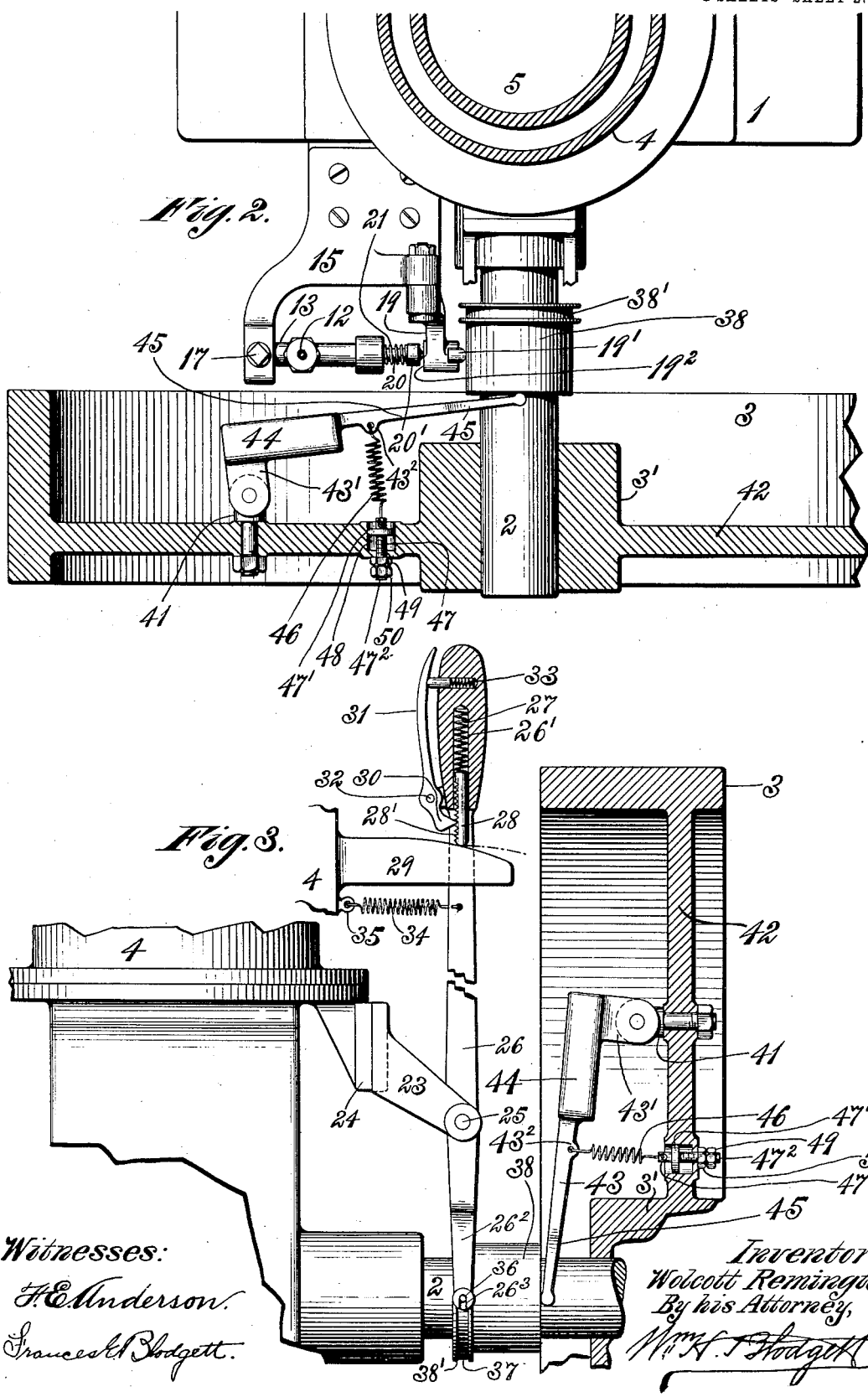

UNITED STATES PATENT OFFICE.

WOLCOTT REMINGTON, OF STAMFORD, CONNECTICUT, ASSIGNOR TO THE REMINGTON OIL ENGINE COMPANY, OF STAMFORD, CONNECTICUT, A CORPORATION OF CONNECTICUT.

INTERNAL-COMBUSTION ENGINE.

No. 903,774.  Specification of Letters Patent.  Patented Nov. 10, 1908.

Application filed October 9, 1905, Serial No. 281,931. Renewed February 25, 1908. Serial No. 417,705.

*To all whom it may concern:*

Be it known that I, WOLCOTT REMINGTON, a citizen of the United States, residing at Stamford, in the county of Fairfield and State of Connecticut, have invented certain new and useful Improvements in Internal-Combustion Engines, of which the following is a specification.

This invention relates to internal combustion engines in which any suitable character of fuel may be employed, as will hereinafter appear.

In one method of vaporizing and igniting fuel known to me oil is first vaporized, the vapor is then mixed with air and compressed, and the mixture is finally ignited either by an electric spark or by engagement with a highly-heated surface. In this method there is more or less cracking of the oil, and it is broken up into its elements sufficiently to cause separation of the carbon, which is always detrimental. Furthermore, the compression before combustion takes place is limited to five or six atmospheres, as at about that point the mixture will fire from the heat generated by its compression.

In another method air alone is compressed to such a degree that its temperature is above the igniting point of the fuel, and then said fuel is injected, combustion taking place when it comes into contact with the highly-compressed air. In this method mechanical difficulties and heavy expense are incurred in manufacturing an engine in which this extremely high compression can be maintained, and such engine when operated by this method can not be reduced in speed much below normal, for if it were the walls of the cylinder would absorb so much of the heat of compression that the temperature of the air at the time of injection of the fuel would not be high enough to ignite it. Again, in this method none but the first particles of fuel which enter the cylinder at each injection come directly into contact with pure air, and as said particles are immediately ignited on contact with the air, the succeeding particles must necessarily pass through the products of combustion, and, therefore, imperfect combustion takes place.

After a series of experiments I have discovered that perfect combustion of the oil or other fuel may be obtained by compressing air or air and water-vapor, to such a degree that its temperature is above that necessary for vaporizing the fuel, but below the temperature at which the fuel ignites, and then injecting the fuel into the compressed-air in such a manner that it passes through the same, is vaporized thereby, and then comes into contact with a heated surface remote from the point of injection, the temperature of which surface is sufficiently high to ignite it. When this method is employed with internal-combustion engines air is first compressed by the piston into a chamber in communication with the cylinder of the engine to such a degree that its temperature is above the temperature necessary for boiling or vaporizing the fuel, but below the temperature at which the fuel ignites, as above stated. After this operation has taken place, and at or just before the start of the working-stroke of the piston, fuel is injected into the volume of compressed air in said chamber, and passing through the same is first vaporized, then comes into contact with the heated-surface described, and is ignited at a point remote from the point of injection. It will, therefore, be seen that all particles of fuel come directly into contact with clean compressed-air of a temperature high enough to cause their vaporization, and that when the first particles of the now vaporized fuel pass through the compressed-air and reach the heated surface they are ignited thereby, and that all succeeding particles are ignited as they enter the flame produced by the combusion of the preceding particles. Consequently, the flame of combustion will start at the heated-surface, and will burn back to the point of injection. In engines built on this system considerable variation in speed is permissible, as the ignition of the fuel is caused by the heated-surface described when its particles percolate through the volume of compressed-air and come into contact with said heated surface. It will thus be seen that the temperature of the heat of combustion will keep above the igniting point of the fuel independent of the heat generated by the compression of the air, and that, inasmuch as the fuel is vaporized at a point much below the temperature required for its ignition, the heat lost in radiation will not materially affect the vaporization of the fuel.

As only a small portion of the fuel enters the chamber leading to the cylinder of the engine before ignition takes place there will be but a slight rise in pressure, and after this the rate of combustion and the pressure will be entirely controlled by the amount of supply of the fuel. After cut-off has taken place the work is, of course, done by the expansion of the heated gases.

Should the load be increased the maximum pressure in the cylinder does not increase, as it simply continues for a longer portion of the stroke, and, conversely, with a decrease of load the maximum pressure will continue for a shorter portion of the stroke.

From what has been stated it will be seen that the particles of fuel are injected into the volume of compressed-air in the chamber at a point, for instance, above the heated surface, and that as such compressed-air is of sufficient temperature to vaporize the fuel, a mixture of fuel-vapor, and compressed-air results while the feed-supply is continued, and that the entrained particles of vapor finally reach the heated-surface by which they are ignited, combustion taking place and the flame produced thereby igniting the succeeding particles of fuel. In this method a clean volume of compressed-air is, therefore, always interposed between the point of feed and the top of the air-compresssing piston, so that complete combustion takes place, and after the cut-off the expansion of the gases causes the working-stroke of the piston. Owing to this fact no tarry or foreign residuum due to imperfect combustion of the fuel is left in the cylinder to clog the piston thereof.

In the accompanying drawings, one form of apparatus viz—a two-cycle internal-combustion engine is shown, and in said drawings Figure 1 is an end view partially in section of an internal-combustion engine. Fig. 2 is a plan view also partially in section of said engine. Fig. 3 is a detail view showing the controlling-lever; and Figs. 4 and 5 are detail views of the feed-controlling-cam.

Like numerals designate similar parts throughout the several views.

Referring to the drawings, the numeral 1 designates the frame of the engine, said frame being of any approved type, and 2 the crank-shaft carrying the usual fly-wheel 3, the inertia of which causes the return of the piston and the compression of air in the chamber above the cylinder to a point sufficient to generate heat necessary to vaporize the fuel, but not to ignite the same.

Bolted to the frame or base 1 is a cylinder 4 in which works a piston 5, and in the exemplification given secured to the top of said cylinder is a head 6 having a chamber 7 in which air is compressed by the piston in the manner just stated.

In the cylinder are inlet-ports 8 and 9, through which fresh air is drawn by the piston, and an exhaust-port 10 to permit the escape of the products of combustion.

Passing through the top of the chamber 7 is a nozzle 11 through which fuel is admitted, said device being, when hydrocarbon fuel is employed, a spray-nozzle, and communicating with this nozzle is a pipe 12 leading to an oil-pump 13.

Projecting from the inner wall of chamber 7 adjacent to its lower end is a hollow steel hemisphere 14, which will be heated externally by a torch in starting the engine, and is subsequently kept hot enough to ignite the fuel by the internal heat of the chamber.

Designated by 15 is a bracket bolted to the frame or base 1, and having an extension 16. On this bracket the pump 13 is mounted and is capable of vertical adjustment by means of a screw 17 secured by a lock-nut 18.

To the bracket 15 is pivoted a lever 19 carrying an antifriction roller 19' at its lower end, said lever having a flattened surface $19^2$ on its outer side against which bears the end of the piston-rod 20 of the pump. Surrounding said piston-rod is a helical spring 21, located between a collar 20' of the rod and the end of the pump. A pipe 22 leads from the pump to the source of oil-supply.

A depending bracket 23 is bolted at its upper end to a ledge 24 of the base or frame 1, and to the free end of said bracket is pivoted at 25 a controlling-lever 26. In its upper end this lever is chambered at 26' to receive a spring 27 and a locking-pin or plunger 28, the lower end of which bears frictionally upon the plain surface of a sector 29 projecting from the cylinder 4. This plunger is toothed at 28' on its inner side, and it is held against displacement by the pawl 30 of a hand-lever 31 pivoted at 32 to an ear of the controlling-lever 26, and thrown to its work by a spring 33.

A coiled-spring 34, connected at one end to the controlling-lever and at its opposite extremity to an ear 35 on the cylinder, tends normally to swing the upper end of said lever toward said cylinder. At its lower end the controlling-lever is forked at $26^2$, and the arms of this fork are each notched at $26^3$ to receive the trunnions 36 of a yoke 37, fitted in a groove 38' of a cam 38. This cam is of peculiar configuration, as will be presently described, and is capable of sliding motion on the engine-shaft 2, a spline or feather 2' of which fits in a groove $38^2$ in the inner wall of the cam. This cam varies in height, and it is made by first working it out on a profiler to form the eccentric peripheral portion 39 extending from one end of its surface to the other. It is then turned to true cylindrical shape between the lines a and b, and then from the line b to the line c the eccentric portion will be turned on a taper of one in ten, the line d representing the intersection of the tapered part with the eccentric part e of the cam. Said cam may be adjusted along its shaft by means of the lever 26, and the key 2' of said shaft is so located that the cam will be in position to start the pump by acting against the roller 19' of lever 19 at or just preceding the working-stroke of the piston 5. An arrow 40, Fig. 1 designates the direction in which the cam rotates, and the pump will be started and the fuel will commence to flow when the point A of the eccentric part 39 of the cam engages the roller 19', and the pump will continue to feed said fuel, the amount of supply being governed by the position of the cam along its shaft. Should the cam be held by either the controlling lever or the governor hereinafter described so that the part f thereof (Fig. 4) is opposite the roller 19' of the pump-actuating lever 19 the fuel will flow through that part of the stroke of the piston 20 corresponding to the arc of rotation A—L of the cam. If any part of the cam between the lines a and b (Fig. 4) should be opposite the roller 19' the piston of the pump will not be actuated and there will be no feed of the fuel. At the point g of the cam, which will be opposite the roller 19' at full load, the pump will be actuated and the fuel will flow through that part of the piston-stroke corresponding to the distance between the points A—B— of the cam (Fig. 5), said arc corresponding to about one-tenth of the piston-stroke, although it may vary in this respect. Between the points C and D (Fig. 5) the piston-rod of the pump will be held advanced after the roller 19' leaves the point D, and the spring 21 will return the piston and its operating lever 19 to normal positions in readiness for a repetition of the operation.

By adjusting the pump either up or down by means of the screw 17 the stroke of its piston may be regulated as described, according to the location of the end of the piston-rod along the surface of lever 19, and to enable adjustment to be made without trouble the pipe 12 is formed into a coil at 12'.

To a stud 41 projecting from the web 42 of fly-wheel 3 is pivoted an arm 43' of a governor-lever 43. This lever is weighted at one end at 44, and at its opposite extremity is forked at 45 to receive the engine-shaft 2, its forked end being located between the hub 3' of the fly-wheel and the end of the cam 38. A spring 46 is connected at one end to an ear 43² of the lever 43, and at its other extremity to an eye-bolt 47, the head 47' of which is mounted in a recess 48 of the web 42. Designated by 47² is the threaded shank of the eye-bolt, said shank passing through a perforation in the end wall of recess 48. A nut 49 serves to adjust the eye-bolt and the governor-lever, and said nut is secured by a lock-nut 50.

When the controlling-lever and cam are in the positions illustrated in Fig. 3, the pump is delivering the maximum amount of fuel to the pipe 12 and spray-nozzle 11, the roller 19' being upon the point g of the cam.

Should the load decrease and the engine increase in speed, the governor-weight 44 will be thrown by centrifugal-force toward the rim of the fly-wheel, and the fork 45 of said weight will force the cam 38 toward the left in Fig. 3, so that, for instance, point f, Fig. 4, of the longitudinally-tapering surface of the cam will be brought opposite the roller 19' of pump-actuating lever 19, thus shortening the stroke of the pump-piston and diminishing the quantity of fuel delivered. During this movement of the cam by the governor the controlling-lever 26 will be swung on its pivot 25, its handle-end traveling toward the right in Fig. 3, and the locking-pin or plunger 28 in the handle will be held against downward movement by the pawl 30, and its lower extremity will leave the smooth surface of the sector 29. Should, however, there be an increase of load the engine will run more slowly, and the governor-weight 44 will fall toward the hub of the fly-wheel, thus permitting the spring 34 to draw the handle-end of the controlling-lever 26 toward the cylinder 4, and causing the lower end of said lever to shift the cam 38 toward the fly-wheel 3 to bring some higher point (for instance g) of the cam into contact with the roller 19', thereby increasing the stroke of the pump-piston, and, consequently, the supply of fuel delivered by the pump.

Should it be desirable to decrease the speed of the engine, for instance, one-half, the pawl 30 is released from engagement with the toothed-surface 28' of the locking-pin or plunger 28, and the upper end of the controlling-lever is pushed toward the fly-wheel, thereby shifting the cam 38 toward the left until the desired feed of fuel for the required speed is obtained, the spring 26' then keeping the end of said locking-pin in contact with the sector. When the desired speed is obtained the handle 31 of the pawl 30 is released and the spring 33 causes said pawl to lock the said pin in the position it then occupies.

When the engine increases in speed above the normal, the governor acts, shifts the cam, and prevents racing, and when the load is again applied the spring 34 shifts the controlling-lever and cam to the positions they occupied before the load was removed.

When the controlling-lever is set so that the speed is below normal the engine will not be under control of the governor until the speed thereof increases.

By providing the lever 26, great and sudden changes of speed frequently occurring in marine work are readily controlled, but for slight permanent changes in speed often necessary in stationary engines, the tension of the governor-spring 46 must be regulated by the bolt 47.

From what has been stated it will be seen that the engine is under perfect control, and that all unfavorable conditions which might arise in the running thereof have been fully provided for, both by the automatic action of the governor, and the controlling-lever and its adjuncts.

By raising the pump in the manner described the end of its piston-rod 20 is brought nearer the pivot of the swinging-lever 19, and due to the shorter arc of movement of the point of the surface $19^2$ against which the end of the rod rests, the pump will supply a less amount of fuel, while by lowering said pump a reverse condition occurs, and there will be an increase in the supply of fuel delivered.

Various forms of governor may be employed as substitutes for the one shown, and the details of the engine may be modified without departure from the invention. Furthermore, the invention is not limited to any special devices for adjusting the pump.

Having thus described my invention, what I claim is—

1. The combination, with a cylinder having inlet and exhaust ports, of a chamber in communication with said cylinder; a piston for forcing air into said chamber; a shaft driven by said piston; a pump; a cam slidably mounted on the shaft, and having an irregular periphery; a pivoted lever having a device in contact with said cam; a pump-piston actuated in one direction by the pivoted lever; a spring for returning said pump-piston; means controlled by the pump for injecting fuel into the combustion-chamber; and means for igniting the fuel in said combustion-chamber.

2. The combination, with a cylinder, of a combustion-chamber in communication with said cylinder; a piston within the cylinder, and serving to force a volume of compressed-air into said chamber; a shaft actuated by the piston; a pump; a pivoted lever; a cam of irregular periphery, and actuated by the shaft for operating the pump; a pipe for delivering fuel from the pump, said pipe leading to the combustion-chamber; and means for igniting the fuel in the combustion-chamber after it has passed through the compressed-air therein.

3. The combination, with a shaft, of a cam having a tapered periphery slidable thereon; means for shifting said cam; a pivoted lever actuated by the cam; a pump, the piston of which is operated by said pivoted lever; and means for adjusting said pump with relation to the pivoted lever.

4. In an internal-combustion engine, the combination, with a cylinder, of a combustion-chamber in communication with said cylinder; a piston working in the cylinder, and serving to compress the air into the combustion-chamber to such a degree that heat will be generated to vaporize the fuel, but not to ignite the same; means in the combustion-chamber for igniting the entrained particles of vaporized fuel in the compressed air at a point remote from the point where the fuel is injected; an engine-shaft; a cam adjustable longitudinally of said engine-shaft, said cam having an irregular periphery; a pump; means controlled by the cam for actuating said pump; a supply-conduit leading to the pump; and a delivery-conduit leading from said pump to the combustion-chamber.

5. In an internal-combustion engine, the combination, with an engine-shaft, of a piston driven by said shaft; a cylinder in which the piston works; a combustion-chamber in communication with said cylinder; a lever pivoted at one end; a cam on the engine-shaft for actuating said lever; a pump actuated by the lever; means for adjusting the pump to locate the piston-rod thereof at different points along the surface of the pivoted lever; a supply-conduit leading to the pump; a discharge-conduit leading from said pump to the combustion-chamber; and means for igniting the fuel delivered by the pump into said combustion-chamber.

6. The combination, with a cylinder having inlet and exhaust-ports, of a combustion-chamber located at the top of said cylinder; a fuel-igniting device coöperating with said combustion-chamber; a piston within the cylinder; a shaft driven by the piston; a cam of irregular periphery slidably mounted upon said shaft; a governor; means controlled by the governor for actuating said cam; a lever having a roller in engagement with the periphery of the cam; a pump; a piston actuated by said lever, and serving to operate the pump; a fuel-supply-pipe leading to the pump; and a fuel-delivery-pipe leading to the combustion-chamber, and through which the fuel is forced by said pump.

7. In an internal-combustion engine, the combination, with a cylinder, and with a combustion-chamber in communication with said cylinder, of a piston working in the cylinder, and serving to compress a volume of air into said combustion-chamber to a degree above the vaporizing point of fuel, but below the igniting point thereof; means whereby fuel may be introduced into said combustion-chamber; means for igniting the fuel after it has passed through the volume of compressed air in the combustion-chamber; a shaft actuated by said piston; a fly-wheel carried by the shaft; a governor controlled by the fly-wheel; a pump; a cam of irregular periphery, actuated by the governor for operating said pump; and a conduit leading from the pump to the combustion-chamber.

8. The combination, with a cylinder having a combustion-chamber communicating therewith, of a piston within said cylinder; a shaft for operating said piston; a pump; a supply-pipe leading to said pump; a pump-piston; a pivoted lever having a surface coöperating with the piston to actuate the pump-piston; a bracket to which the lever is pivoted; a cam having an irregular periphery, and slidably mounted upon the engine-shaft; a governor for controlling the movement of said cam; and means for adjusting the pump vertically, whereby the position of the end of its piston in contact with the pivoted lever may be varied as desired.

9. The combination, with a cylinder of an internal-combustion engine, of a piston therein; a shaft actuated by the piston; a cam slidingly-mounted upon said shaft; a pump; means operated by the cam for actuating the pump; a sector; a pivoted lever for adjusting the cam; a locking-device carried by said lever, and bearing against the sector; and means for retaining said locking-device against movement.

10. The combination, with a cylinder of an internal-combustion engine, of a piston therein; a shaft actuated by the piston; a cam slidingly-mounted upon said shaft; a pump; means controlled by the cam for actuating said pump; a sector; a pivoted lever for adjusting the cam; a locking-device carried by said lever, and bearing against the sector; means for retaining said locking-device against movement; a fly-wheel rigid with the shaft; and a governor carried by said fly-wheel, and connected with said cam.

11. The combination, with a cylinder of an internal-combustion engine, of a piston; a shaft driven by said piston; a cam rotatable with said shaft; a pump; means actuated by the cam for operating said pump; a sector having a smooth surface; a controlling-lever for said cam; a spring-actuated locking-pin carried by the controlling-lever; and means for securing said locking-pin against movement while it is in engagement with any part of the sector.

12. The combination, with the cylinder of an internal-combustion engine, of a piston working in said cylinder; a shaft driven by the piston; a fly-wheel carried by the shaft; a cam, having a tapered and eccentric periphery, and mounted for rotation with and for sliding adjustment on the shaft; a governor for actuating said cam; a pivoted lever; a pump actuated by said pivoted lever; and means for conveying fuel from said pump to the cylinder.

13. The combination, with a cylinder of an internal-combustion engine, and with a combustion-chamber communicating with said cylinder; of a fuel-pump; a conduit leading from the pump to the combustion-chamber; a piston working within the cylinder, and serving to force compressed-air into the combustion-chamber; means for igniting the fuel in said combustion-chamber at a point distant from the place where it is introduced therein; a shaft actuated by the piston; a cam, having a tapered and eccentric periphery, and rotatable with, and slidably-mounted on said shaft; a pivoted lever actuated by the cam, and against which the end of the piston-rod of the pump bears; means for automatically shifting the cam; and means for manually-shifting said cam.

14. The combination, with a cylinder of an internal-combustion engine, said cylinder having a combustion-chamber, of a piston for forcing compressed-air into said combustion-chamber; a shaft actuated by said piston; a sector projecting from the cylinder; a cam having a tapered and eccentric surface rotatable with the shaft, and slidable thereon; a pivoted controlling-lever for adjusting the cam; a spring-actuated locking-pin carried by the controlling-lever, and in engagement with the sector, said locking pin having a toothed surface; a lever having a pawl in engagement with the toothed surface of the locking-pin; a fuel-pump; means actuated by the cam for operating the piston of said fuel-pump; means for delivering fuel from the pump to the combustion-chamber; and means for igniting the fuel within said combustion-chamber.

In testimony whereof I affix my signature in presence of two witnesses.

WOLCOTT REMINGTON.

Witnesses:
FRANCES E. BLODGETT,
S. S. GROTTA.